Sept. 21, 1965     D. F. WILLCOX     3,207,971

SEQUENCE TIMER

Original Filed July 13, 1959     2 Sheets-Sheet 1

INVENTOR.
DALE F. WILLCOX
BY
John W. Michael
ATTORNEY

Sept. 21, 1965    D. F. WILLCOX    3,207,971
SEQUENCE TIMER
Original Filed July 13, 1959    2 Sheets-Sheet 2
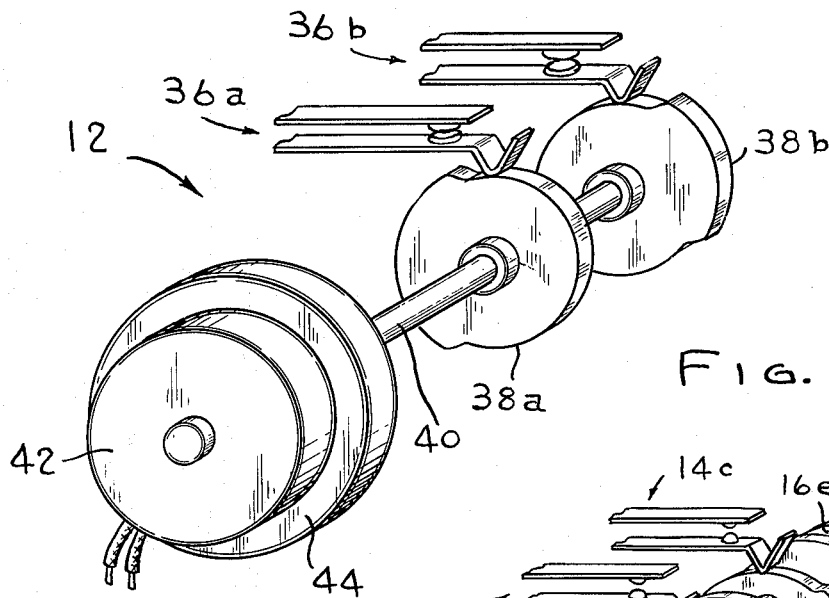
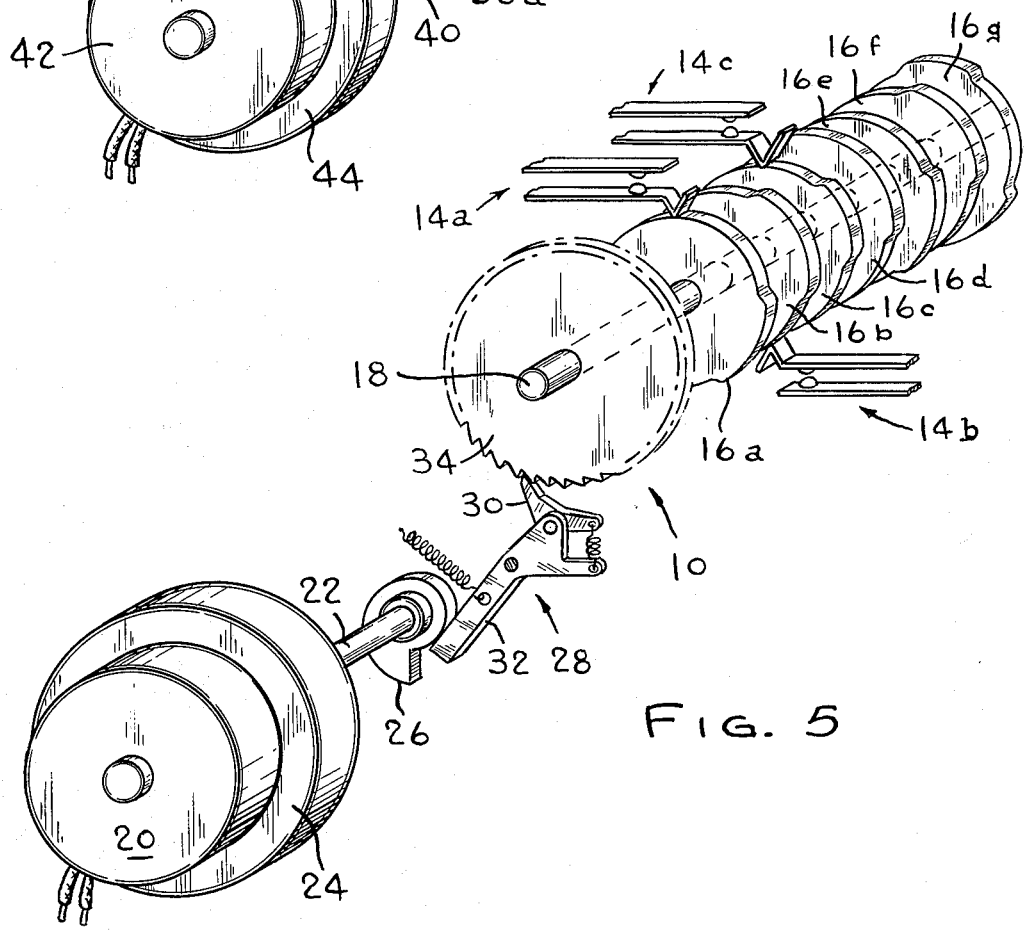
INVENTOR.
DALE F. WILLCOX
BY
John W. Michael
ATTORNEY

United States Patent Office 3,207,971
Patented Sept. 21, 1965

3,207,971
SEQUENCE TIMER
Dale F. Willcox, Aurora, Ill., assignor to Controls Company of America, Schiller Park, Ill., a corporation of Delaware
Continuation of application Ser. No. 826,527, July 13, 1959. This application July 27, 1964, Ser. No. 386,111
11 Claims. (Cl. 318—486)

This is a continuation of Dale F. Willcox application Serial No. 826,527, filed July 13, 1959, now abandoned.

This invention relates to sequence timers and particularly to an improved timer affording increased program capacity.

Sequence timers used on appliances are generally of the rotary type and afford program possibilities within 360 degrees of rotation. The timer usually includes a plurality of cam actuated program switches driven by a constant speed motor through a stepping mechanism which advances the program cams a predetermined number of degrees at predetermined intervals. The usual practice is to provide fifty or sixty intervals per revolution and to advance the cams at the rate of one interval each minute.

In the past the program capacity of such a timer was sufficient. However, with recent advances and refinements in the appliance industry involving combination washers and dryers, for example, it has become necessary to provide for more and more programs within the limited space available. The problem can be demonstrated by this simple example. Assume there are fifty steps or intervals per 360 degrees of rotation and the cams are advanced one step per minute. When such a timer is used on a washing machine, for example, one-fifth of the total timing capacity is used up during a 10-minute wash cycle of a single program leaving insufficient capacity remaining to perform other programs.

Previous attempts to provide increased capacity and improved flexibility demanded by today's more complex appliances have not proven satisfactory. One approach was to increase the number of intervals or steps per revolution, i.e. finer indexing of the device. Such finer indexing, however, makes it difficult to accurately position the indicator dial and also makes the operation of the cam actuated switches more critical. Complicated gear shifting mechanisms to vary the speed of the timing mechanism have also been attempted but for reasons of cost have met with little success.

It is the object of this invention, therefore, to provide a relatively simple and inexpensive sequence timer having increased capacity and improved flexibility over that of previous timers.

This is accomplished by providing a percentage timer in conjunction with a main timer of conventional design wherein such percentage timer will vary the effective speed of the main timer motor by controlling the percentage of time such motor is energized. The percentage timer includes a second constant speed electric motor and a plurality of cam actuated control switches driven by the motor. The cams actuating the control switches are designed to close such switches for only a percentage of the time the second motor runs. Thus, by connecting the control switches of the percentage timer in series with the main timer motor it is possible to vary the time the timer motor is energized and thus effectively vary the speed of the motor to thereby vary the rate at which the stepping mechanism will advance the program cams of the main timer.

To fully utilize this means of speed variation, I provide selector means responsive to the operation of the main timer to automatically select the speed at which the percentage timer will allow the main timer motor to run. Such selector means includes a plurality of cam actuated selector switches actuated in a predetermined sequence by the main timer motor. Each of such switches is connected in series with one of the control switches of the percentage timer which, as previously pointed out, are closed for a predetermined percentage of time. Thus, it is seen that by the use of a few relatively inexpensive parts, the effective speed of the main timer can be varied automatically in response to successive program functions. The result is a timing device of increased capacity and greater flexibility.

Further refinements of the basic timer arrangement described above include the relative positioning of the percentage timer control cams whereby an additional control speed can be provided and the provision of a manual preselector switch to permit pre-selection of one of several main timer speeds for a particular function. Such a switch may be used to pre-select the duration of a washing operation, for example.

Other objects and advantages will be pointed out in, or be apparent from the specification and claims, as will obvious modifications of the several embodiments shown in the drawings, in which:

FIGS. 4 and 5 are partially schematic perspective views of a percentage timer and main timer, respectively, of the type suitable for use in the practice of my invention.

While the following description is directed primarily to a sequence timer used in the appliance industry, it should be understood that the use of the invention is not limited to this field.

Figure 1:
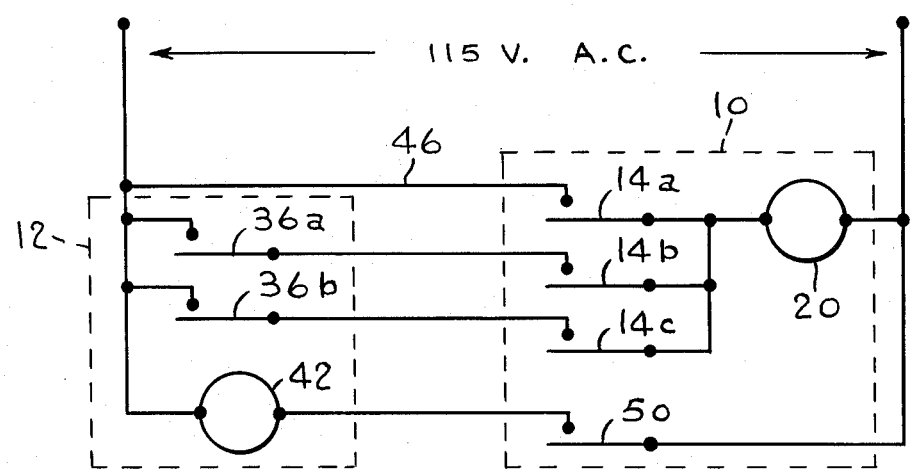
FIG. 1 is a simplified wiring diagram of a timing device embodying my invention.

Referring to the drawings, the simplified wiring diagram of my timing device shown in FIG. 1 includes a main timer 10 and a percentage timer 12 (both as indicated by dotted lines) connected across a 115 volt A.C. line as shown. Main and percentage timers 10 and 12 may be of any suitable construction such as that shown generally in FIGS. 5 and 4, respectively.

A main timer (FIG. 5) of the type suitable for use in the practice of my invention includes a plurality of switches 14a, 14b, 14c, etc. mounted for actuation in a predetermined sequence by a plurality of cams 16a, 16b, 16c, etc. mounted on a cam shaft 18. Cams 16a, 16b and 16c are shown actuating control switches 14a, 14b and 14c in the percentage timer circuit and cams 16d, 16e and 16f are used to control function switches (not shown) that are actuated to operate different washing functions during different intervals of the timer. While there are only three switches shown operated by the cams it should be understood that there is at least one switch for each cam and that the number of cams and switches can be decreased or increased depending on the particular application involved.

Main timer 10 is powered by a synchronous motor 20 which drives shaft 22 through a train of reduction gears in housing 24. The bank of cams is driven one step at a time by a drop cam 26 on shaft 22 by means of a step-by-step ratchet drive 28 which includes a feed pawl 30 pivotally mounted on drive lever 32 for step-by-step actuation of toothed ratchet wheel 34 mounted on cam shaft 18.

A rotary timer of the type shown in FIG. 5 afforded ample capacity for the relatively few programs required by washing machines of a few years back. The trend, however, has been to more and more complex machines designed, for example, to custom wash different materials by means of various combinations of water temperature, agitator speed, etc. Thus, timers of greatly increased program capacity are now required creating the problem of how to compress additional programs into the 360 degrees available on a rotary timer.

Previous attempts to increase the capacity and versatility of motor driven sequence timers by finer indexing of the ratchet wheel (increasing the number of teeth on wheel 34) or by the use of complicated gear shifting mechanisms have, for reasons previously stated, proven unsatisfactory. A need has developed therefore for a simple, effective and relatively inexpensive arrangement whereby the capacity and flexibility of the main timer can be substantially increased.

To this end I have devised a novel yet simple means which, broadly stated, will vary the effective speed of the main timer automatically in response to the operation of the main timer itself to thereby provide an improved timing device having the above characteristics. To accomplish this I provide a percentage timer 12 connected in circuit with main timer 10 as shown in FIG. 1. Percentage timer 12 may be constructed in accordance with FIG. 4 which, as illustrated, includes a plurality of control switches 36a, 36b actuated by control cams 38a, 38b mounted on a cam shaft 40 and connected to the main timer by conductors 35. Shaft 40 of the percentage timer is driven directly by a motor 42 through reduction gearing in housing 44 instead of through a step-by-step ratchet drive as in main timer 10.

Referring now to FIG. 1, percentage timer motor 42 is shown connected across the line through the main timer which is provided with a cam operated switch 50 which will de-energize motor 42 at the end of each program. Switch 50 will be closed by closure of the line switch (not shown) when at any position other than "off."

As shown in FIG. 1, main timer 20 may be energized from the left-hand side of the line through any one of conductors 35 or conductor 46 (connected directly to the line). Control cams 38a, 38b of the percentage timer are designed so that they will close switches 36a, 36b for only a portion of each revolution. Thus, it is seen that if main timer motor 20 were connected in series with switch 36a, for example, it would be energized for only that portion of each revolution of cam 38a that switch 36a is held closed by the cam. Thus, if cam 38a were designed to close switch 36a during 25% of each revolution and cam 38b was designed to close switch 36b during 33⅓% of each revolution, instead of main timer motor 20 advancing wheel 34 at the rate of one step per minute it would advance wheel 34 one tooth every four minutes when connected in series with switch 36a and would advance the wheel one tooth every three minutes when connected in series with switch 36b. When motor 20 is connected directly across the line by conductor 46 it will advance the cams at its rated speed of one tooth per minute.

From the foregoing, it is seen that by the use of a percentage timer arrangement such as that shown in FIG. 1, it is possible to vary the effective speed of the main timer motor. This makes it possible to reduce the effective speed of the main timer during a washing operation, for example, and thereby increase the capacity of the timing device. To fully utilize this principle of speed variation I provide additional means for automatically selecting the speed desired for a particular function or operation of the machine. This is accomplished by a plurality of cam operated selector switches 14a, 14b and 14c operated from cam shaft 18 of the main timer and connected in series with conductor 46 and switches 36a and 36b, respectively as shown in FIG. 1. With this arrangement, when the wash operation is started, for example, cam 16b, which actuates switch 14b, can be positioned so that it will close switch 14b and thereby connect percentage timer switch 36a in series with the main timer motor 20. As explained previously, when this happens the cams of the main timer will be advanced at the rate of one tooth every four minutes instead of at its rated speed of one tooth per minute. Thus, if a 16-minute wash is desired only four teeth need to be advanced on the wheel 34 to provide the 16-minute interval compared to a 16-tooth advance under prior practice. Similarly, if, during a different operation of the washing machine, a reduction of speed to one tooth every three minutes were desired, switch 14c would be closed at the proper time to energize main timer motor 20 through switch 36b which is closed by cam 38b during one-third of each revolution.

It should be understood that while only a 25% cam operated switch 36a and a 33⅓% cam operated switch 36b are shown in the illustrated embodiment (FIG. 1), the number of percentage timer control cams and switches and corresponding selector switches could be increased to provide additional speed selection.

Figure 2:
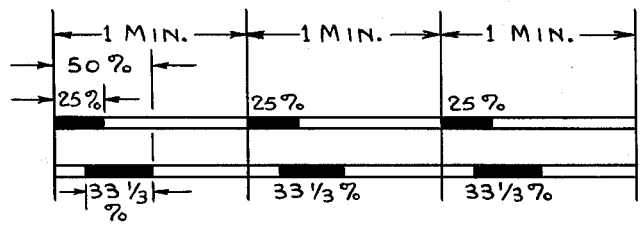
FIG. 2 is a schematic diagram showing how additional speed variation can be obtained by the positioning of a pair of control cams of the percentage timer shown in FIG. 1.

It is possible, however, to obtain additional speeds without providing additional control cams and switches by connecting both switches 36a and 36b into the circuit at the same time and properly arranging the relative positions of percentage timer cams 38a and 38b on shaft 40. Thus, as schematically illustrated in FIG. 2, if cams 38a and 38b are properly staggered and both switches 36a, 36b are selected (by closing both switches 14b, 14c), motor 20 can be run 50% of the time to thereby advance wheel 34 one step every two minutes. While cams 38a, 38b are shown arranged to provide 50% operation, it will be recognized that other percentages can be provided by varying either the staggered relationship between the cams or the construction of the cams themselves.

Figure 3:
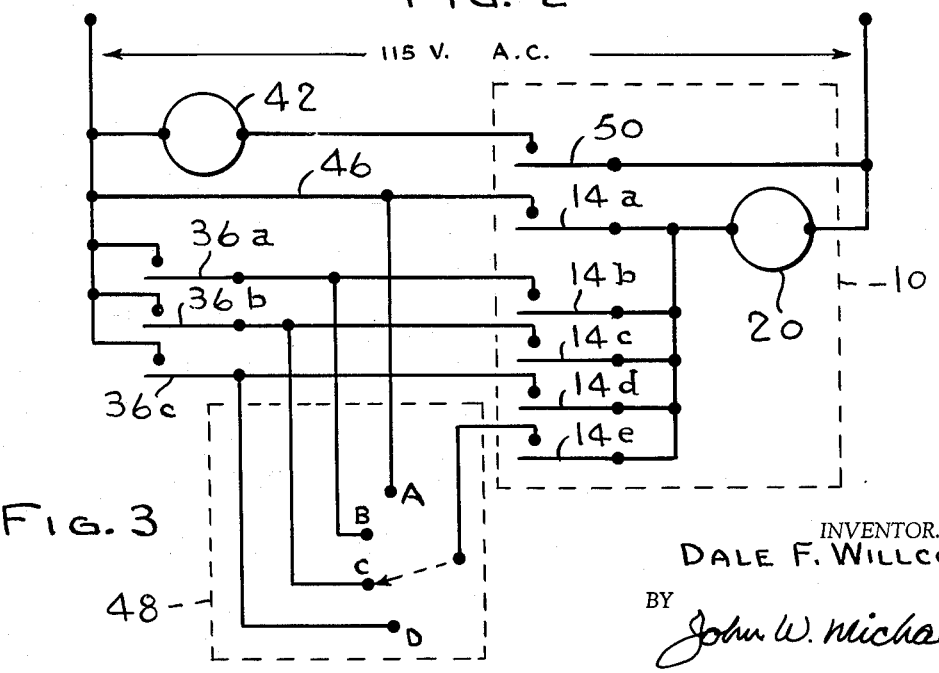
FIG. 3 is a view similar to FIG. 1 showing a modification of my invention.

FIG. 3 shows a modification of the basic arrangement (FIG. 1) in which a manual pre-selector switch 48 is provided to permit the operator to pre-set the control to give a wash or spin period, for example, of any one of several different durations.

Assume it is desired that the operator be able to pre-select wash periods of 5, 10 and 20 minutes duration. This may be accomplished by adding a cam actuated control switch 36c to the percentage timer 12 which will close 50% of the time and by incorporating additional cam actuated selector switches 14d and 14e of main timer 10 into the circuit with a multipole pre-selector switch 48 having positions A, B, C and D as shown in FIG. 3. Switch 14d is connected in series with 50% switch 36c and thereby serves as the selector switch for the 50% cam of the percentage timer. Switch 14e is connected in series with pre-selector switch 48 and thereby serves as the selector switch for manual pre-selection of the wash period. As will now be described, cam 16e which actuates switch 14e is designed to keep the switch closed during a five-tooth advance of wheel 34 to thereby provide the 5, 10, 15 and 20 minute wash periods mentioned above.

Now suppose a 15-minute wash period is desired. Switch 48 is set to position C as shown. When the wash operation starts switch 14e will close and thereby connect the 33⅓% switch 36b of the percentage timer in series with main timer motor 20. Thus, as previously explained, ratchet wheel 34 of the main timer will be advanced one tooth every three minutes requiring a total of fifteen minutes for the main timer to advance wheel 34 five teeth, at which time switch 14e will open ending the wash operation. Similarly, with switch 48 set in either the A, B, or D positions, conductor 46 (direct to line), switch 36a (25%), and switch 36c, (50%), respectively, will be connected in series with motor 20 to thereby provide wash periods of 5, 20 and 10 minutes for the three positions in the order stated. While a multipole-type switch 48 is shown, it should be understood that a series of separate push button switches could be used, for example, to provide the same operation.

Although several embodiments of the present invention have been illustrated and described, it will be apparent to those skilled in the art that various changes and modifications may be made therein without departing from the spirit of the invention or from the scope of the appended claims.

What I claim is:

1. In a sequence timer having a plurality of program switches actuated in a predetermined sequence by a main timer motor, the combination of, control means including a second timer motor and a plurality of control switches actuated by said second motor for starting and stopping said main timer motor to vary the percentage of time said main motor is energized, selector means responsive to the operation of said main timer motor to select which of the control switches is to be effective, and pre-selector means including manual switches connected in series with said main timer motor, said pre-selector means being responsive to the operation of said main timer to automatically select a manually pre-selected percentage of time during which said control means will allow said main timer motor to run.

2. A sequence timer according to claim 1 including a selector switch, said pre-selector means being responsive to the operation of said main timer motor by said selector switch which is actuated by said main timer motor and connected in series with said manual switches.

3. In a sequence timer having a plurality of program switches actuated in a predetermined sequence by a main timer motor, the combination of, a plurality of control switches connected in parallel with each other and each connected in series with said main timer motor, a second timer motor, control cam means driven by said second motor and adapted to hold said control switches closed for only a percentage of the time said second motor is run, manually actuated switches connected in series with said main timer motor and adapted to connect said main timer motor in series with each of said control switches, a selector switch for each of said control switches and for said manual switches connected in series therewith, and selector cam means driven by said main timer motor adapted to open and close said selector switches in a predetermined sequence.

4. A timer comprising, a first timing device, switch means operated by the timing device, said timing device being adapted for step-by-step advancement to effect a timed sequence in the operation of the switch means, means for advancing the timing device in a step-by-step manner at spaced timer intervals, a second timing device, switch means operated by the second timing device, circuit means connecting certain of the switches opearted by the first timing device with the switch means operated by the second timing device so that the first timing device determines which of the switch means operated by the second timing device is effective, the effective switch means operated by the second timing device being in circuit with and operative to control the advancing means.

5. A timer comprising, a sequence control device including a first group of switch devices, electrically energized means for advancing the sequence control device, a timing device including a second group of switch devices connected in circuit with the electrically energized means, each of the switch devices of the second group being operative to energize the electrically energized means at different time frequencies, some of the switch devices in the first group being connected in circuit with the switch devices in the second group for determining which of the switch devices in the second group is operative to determine the frequency of energization of the electrically energized means.

6. Timing apparatus comprising, a sequence timer including an electrically energized device for advancing the timer in a step-by-step manner, a group of switches operated by the timer in a sequential manner, a creep-type timer including a second group of switches operated thereby, and an electric circuit including the second group of switches and said device whereby the effective switch in the second group will determine the frequency of energization of said device to thereby determine the duration of the interval between the step-by-step advances of the sequence timer, some of the switches in the first group being in said circuit whereby the sequence timer operation determines which of the second group will be effective in controlling the interval duration of a given portion of the sequence timer cycle.

7. Timing apparatus comprising, a sequence timer including an electrically energized device for advancing the timer in a step-by-step manner, a group of switches operated by the timer in a sequential manner, a creep-type timer including a second group of switches operated thereby, an electric circuit including the second group of switches and said device whereby the effective switch in the second group will determine the frequency of energization of said device to thereby determine the duration of the interval between the step-by-step advances of the sequence timer, and manual switch means in said circuit for determining which of the second group of switches will be effective.

8. Timing apparatus comprising, a sequence timer including an electrically energized device for advancing the timer in a step-by-step manner, a group of switches operated by the timer in a sequential manner, a creep-type timer including a second group of switches operated thereby, an electric circuit including the second group of switches and said device whereby the effective switch in the second group will determine the frequency of energization of said device to thereby determine the duration of the interval between the step-by-step advances of the sequence timer, and manual switch means in said circuit for determining which of the second group of switches will be effective, said first group of switches including at least one switch in circuit with the manual switch means so that determination made by the manual switch means is not effective until said one switch completes the circuit through the manual switch means.

9. Timing apparatus comprising, a sequence timer including an electrically energized device for advancing the timer in a step-by-step manner, a group of switches operated by the timer in a sequential manner, a creep-type timer including a second group of switches operated thereby, an electric circuit including the second group of switches and said device whereby the effective switch in the second group will determine the frequency of energization of said device to thereby determine the duration of the interval between the step-by-step advances of the sequence timer, some of the switches in the first group being in said circuit whereby the sequence timer operation determines which of the second group will be effective in controlling the internal duration of a given portion of the sequence timer cycle, and manual switch means in said circuit for determining which of the second group of switches will be effective, said first group of switches including at least one switch in circuit with the manual switch means so the determination made by the manual switch means is not effective until said one switch completes the circuit through the manual switch means.

10. In a sequence timer having a plurality of program switches actuated in a predetermined sequence by a main timer motor, the combination of, a plurality of control switches connected in parallel with each other and each connected in series with said main timer motor, a second timer motor, control cam means driven by said second motor and adapted to hold said control switches closed for a given percentage of the time said second motor is run, a selector switch for each of said control switches connected in series with said control switches, and selector cam means driven by said main timer motor adapted to open and close said selector switches in a predetermined sequence.

11. First and second timers each including a motor, a plurality of switches operated by the first timer to vary the running time of the second timer, a plurality of switches operated by the second timer to select which of the switches operated by the first timer is to be effective.

References Cited by the Examiner

UNITED STATES PATENTS

| | | | |
|---|---|---|---|
| 2,393,187 | 1/46 | Powell | 307—191.4 |
| 2,905,239 | 9/59 | Dietz | 307—191.4 |
| 3,003,097 | 10/61 | Jennings | 318—443 |

JOHN F. COUCH, *Primary Examiner.*

UNITED STATES PATENT OFFICE
CERTIFICATE OF CORRECTION

Patent No. 3,207,971                         September 21, 1965

Dale F. Willcox

It is hereby certified that error appears in the above numbered patent requiring correction and that the said Letters Patent should read as corrected below.

Column 5, line 54, for "opearted" read -- operated --; column 6, line 57, for "internal" read -- interval --.

Signed and sealed this 3rd day of May 1966.

(SEAL)

Attest:

ERNEST W. SWIDER                       EDWARD J. BRENNER

Attesting Officer                           Commissioner of Patents